(12) United States Patent
Boffemmyer et al.

(10) Patent No.: US 8,276,063 B2
(45) Date of Patent: Sep. 25, 2012

(54) SYSTEM AND METHOD FOR IMPORT AND EXPORT FROM A SOLID MODELING PROGRAM

(75) Inventors: John E. Boffemmyer, Concord, NC (US); Scott W. Black, Kirkville, NY (US); Christian C. Herbeck, Seminole, FL (US)

(73) Assignee: Carrier Corporation, Farmington, CT (US)

( * ) Notice: Subject to any disclaimer, the term of this patent is extended or adjusted under 35 U.S.C. 154(b) by 1243 days.

(21) Appl. No.: 11/793,118

(22) PCT Filed: Dec. 14, 2005

(86) PCT No.: PCT/US2005/045227
§ 371 (c)(1),
(2), (4) Date: Jun. 14, 2007

(87) PCT Pub. No.: WO2006/065895
PCT Pub. Date: Jun. 22, 2006

(65) Prior Publication Data
US 2008/0092036 A1    Apr. 17, 2008

Related U.S. Application Data

(60) Provisional application No. 60/636,265, filed on Dec. 14, 2004.

(51) Int. Cl.
*G06F 17/00* (2006.01)
(52) U.S. Cl. ........................... 715/234; 715/237
(58) Field of Classification Search ............ 715/200, 715/234, 248–249, 964
See application file for complete search history.

(56) References Cited

U.S. PATENT DOCUMENTS

| | | | | |
|---|---|---|---|---|
| 6,516,452 | B2 * | 2/2003 | Meding | 716/5 |
| 6,795,089 | B2 * | 9/2004 | Rajarajan et al. | 345/629 |
| 7,281,015 | B2 * | 10/2007 | Brown et al. | 1/1 |
| 2002/0052807 | A1 | 5/2002 | Han et al. | 705/27 |
| 2002/0059049 | A1 | 5/2002 | Bradbury et al. | 703/11 |
| 2002/0188622 | A1 | 12/2002 | Wallen et al. | 1/1 |
| 2003/0065413 | A1 | 4/2003 | Liteplo et al. | 700/96 |

OTHER PUBLICATIONS

International Search Report for International Application No. PCT/US2005/045227 dated Jun. 9, 2006.

* cited by examiner

*Primary Examiner* — Manglesh M Patel
(74) *Attorney, Agent, or Firm* — Cantor Colburn LLP

(57) ABSTRACT

There is provided a computer-implemented method for importing information stored in a tag-based markup language file into a computer modeling software package, and exporting changes in the information back to the file. There is also provided a system, and associated instructions for carrying out the method.

14 Claims, 3 Drawing Sheets

SYSTEM AND METHOD FOR IMPORT AND EXPORT FROM A SOLID MODELING PROGRAM

CROSS-REFERENCE TO RELATED APPLICATIONS

The present application is claiming priority of U.S. Provisional Patent Application Ser. No. 60/636,265, filed on Dec. 14, 2004, the content of which is herein incorporated by reference.

BACKGROUND OF THE INVENTION

1. Field of the Invention

The present invention relates to configuration of data, and more particularly, to configuration of data from a web-based programming language for compatibility to a modeling software platform.

2. Description of the Related Art

Computer models, i.e., computer programs which attempt to simulate an abstract model of a system, have become extremely useful in a variety of areas including natural systems, human systems and engineering. Computer models are useful for predicting the behavior of systems based on inputted parameters and initial conditions.

Solid modeling, i.e., the creation of a virtual representation of the solid parts of an object, have become prevalent in engineering and are commonly used by machine designers. Much design in modeling utilizes assembly modeling methods to model and test an entire product including its constituent components. An example of a modeling software package is CAD (Computer-Aided Drafting).

Due to the convenience and prevalence of the Internet, many manufacturers now receive orders and specifications for the manufacture of products via a network. A customer may order a product, and provide desired specifications via an input to a web browser. These parameters, required for manufacturing the desired product, are delivered to a manufacturer through a server. This information is often delivered via a web-based markup language such as HTML (HyperText Markup Language) and XML (Extensible Markup Language). When a customer enters the desired specification information into a browser, during the ordering of a product, this information is stored in a file that utilizes XML, HTML or other web-based language.

A significant problem with this ordering scheme is that information presented in web-based languages is not readily configurable to be incorporated into a model built in a modeling program. A customer does not enter parameters directly into a modeling program, but rather posts specifications to a server in a web-based language. Because modeling software does not recognize HTML or XML, this information is generally used to actually build the unit based on the provided specification without modeling. As a result, potential problems with the unit cannot be detected until the unit is actually manufactured. Alternatively, the specifications may be incorporated into a model by a modeling programmer. However, this process is very time-consuming.

SUMMARY OF THE INVENTION

It is an object of the present invention to provide a method and system for automatically configuring information stored in a tag-based markup language into a format that can be recognized and incorporated by a computer modeling software program.

It is an object of the present invention to provide a method and system for importing and exporting information stored in a tag-based markup language into a computer modeling software package.

The present invention provides a computer-implemented method for importing information stored in a tag-based markup language file into a computer modeling software package, and exporting changes in the information back to the file. The present invention also provides a system, and associated instructions for carrying out the method.

DESCRIPTION OF THE INVENTION

Before proceeding with a description of the present invention, it is well to define certain terms as used herein.

"Import software", or "Import module", generally refers to the software package provided in the present invention, specifically providing instructions for configuration, determining whether a web-based markup language file is valid, and importing and exporting between the web-based language file and a computer modeling software program. The computer modeling software is preferably a solid modeling software program.

The term "module" is used herein to demarcate a functional operation that may be embodied either as a stand-alone component or as one of a plurality of modules in an integrated assembly.

The method and system of the present invention define the syntax and methods for both importing a web-based language file into a solid modeling software package and exporting changes back to the web-based language file. A "web-based language" or a "tag-based markup language" refers to a text-based language such as a markup language. Specific examples of markup languages include a standard general markup language (SGML), and more particularly, a hypertext markup language (HTML) and an extensible markup language (XML). The invention is described in the context of XML. However, this is exemplary, and other web-based or markup languages may be utilized in conjunction with the present invention.

The software and method of the present invention define two types of files: a configuration file and an XML import/export file. The configuration file is used to communicate the format of the XML import/export file and to configure the solid modeling software properties. Software properties include names of templates and variables to be used in the modeling software. A template is a generic model of a given part. It includes generic part surfaces, general dimensions, and possible features that can be applied to the part. The XML import/export file contains the structure of a specific model to be imported into and assembled by the solid modeling software. Files described herein are in a XML format. However, such files may be in other web-based or markup language formats such as HTML.

Both the configuration files and the import/export files contain common components. Each of these files contain elements, which may contain specification information, configuration information, or other information relating to the specifications or format of the model to be built by the solid modeling software. Elements may be further divided into child nodes. Each element is further accompanied by a tag, examples of which are described herein.

Figure 1:
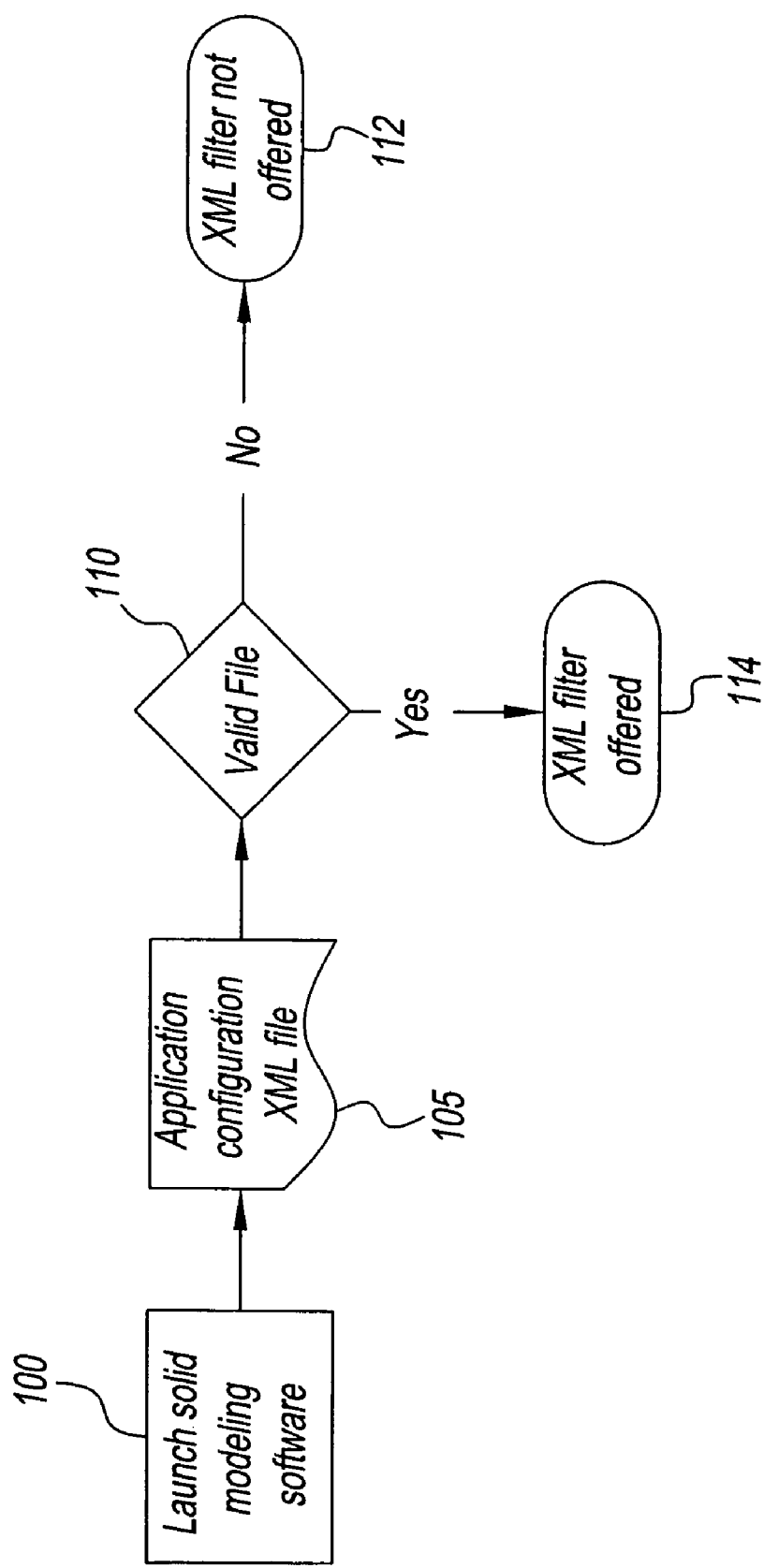
FIG. 1 is a flow diagram showing an optional initial step of a method of the present invention.

FIG. 1 is a flow diagram of an initial step of a method of importing XML file data directly to a solid modeling program, according to the present invention. An import/export file is created from specification information provided by a user, e.g., a customer ordering a product. This initial step involves determining whether the XML import/export file can interact with the solid modeling software. The XML import/export file is created by specification information input by a user, which specifies various attributes, such as choosing components, specifying sizes, shapes and capabilities of a product to be manufactured.

The method begins with the execution of step 100. In step 100, the solid modeling software is launched. In step 105, the import software reads an XML filter configuration file. The XML filter configuration file notifies the input software to offer the XML filter option to a user via the modeling application. In step 110, the input software determines from the XML filter configuration file whether the XML import/export file is in a valid format. In step 112, if the XML file is not valid, the input software will not offer an XML filter, i.e., will not offer to import information from the XML file into the solid modeling software. In step 114, if the XML file is valid, the input software will offer an XML filter, i.e., will allow for the importation of information from the XML file to the solid modeling software.

Figure 2:
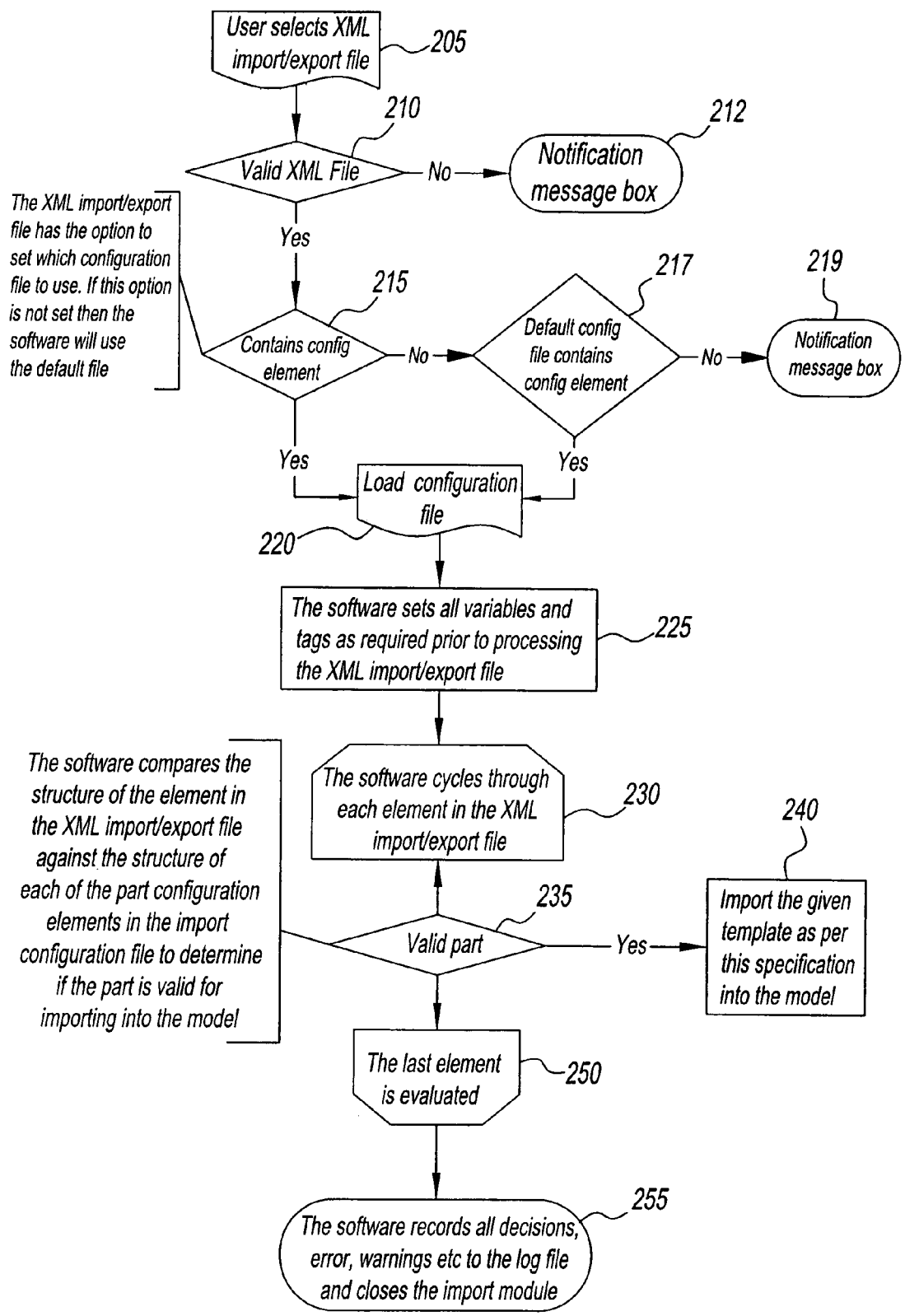
FIG. 2 is a flow diagram showing an embodiment of the method of the present invention.

FIG. 2 is a flow diagram demonstrating a method according to an embodiment of the present invention. In step 205, a user selects an import/export file to be used in conjunction with a preferred modeling software. As shown in step 210, a solid modeling import configuration file determines whether the import/export file is valid. If the import/export file is not valid, e.g., the tags in the import/export file are incorrectly configured, the software presents a notification to the user per step 212. If the import/export file is valid, the software then determines whether the XML file contains a configuration element, per step 215.

The solid modeling import configuration file serves as a map for the import/export file to map the given XML parts and the part details to a specific modeling software part template. The selection of a solid modeling import configuration file is done by a key identifier in the XML file that points the XML data to a specific part template. The handling of this identifier is preferably accomplished through a common Unix® tool called "Regular Expression".

A configuration element contains a selection of a specific import configuration file by a user, or information submitted by a user for the creation of a new import configuration file. The configuration element is the data mapping in the configuration file that tells the software when to use a specific template, where the template is located and what changes can be made to it.

When a user is entering specification information that is stored in the XML import/export file, the user has the option of specifying or creating a specific solid modeling import configuration file. If the XML import/export file contains a configuration element, the import software sets this configuration file for use and loads this configuration file into the software, as shown in step 220. If there is no configuration file set by the user, the import software sets a default configuration file, per step 217. If the XML import/export file does not contain a configuration element, the software notifies the user with a displayed message box, per step 219.

After the import software sets a user-selected configuration file or the default configuration file into the software module, the configuration file is loaded by the software into the RAM of the computer running the modeling software and is controlled by the modeling software, per step 220.

As shown in step 225, the software then reads each element of the import configuration file and sets all required variables and tags prior to processing the import/export file.

In step 230, after the configuration of the tags used in the XML files and configuration of the variables used by the modeling software are set, the software then cycles through each element of the import/export file. Per step 235, the software then determines if the element represents a valid part. The software compares each element in the import/export file to the structure of part configuration elements in the solid modeling import configuration file to determine whether the element in the import/export file is valid for inputting into a model being built in the modeling software. If the element is valid, the parameters in the element are used to create a template that is imported into the model, as shown by step 240.

Once an import/export file has been used to identify a part to be imported, a valid solid modeling template must be available. Currently, there are three valid types of parts to be imported into a model: Standard, Parametric, and Family Tables. Each part must contain at a minimum a part origin.

A standard part is any part that is not a Parametric type part or part belonging to a Family Table. A parametric part is any part that requires predefined parametric values to be assigned before becoming a valid part. Parametric parts must be imported with assigned parametric values from the import/export file. A family table part is an instance of a family table. Family table parts require a key identification value from the import/export file to select which instance of the XML import/export file to import.

The software performs the above method on each element in the import/export configuration file until the last element is evaluated per step 250.

When all templates reflecting each specification element are imported into the model, the software records all decisions, errors, warnings, or other notifications to a log file and closes the import module, per step 255. The modeling software is then utilized to perform tolerance checks and other functions to evaluate the constructed model.

In another embodiment, the software exports changes to the model back to the import/export file. Information representing changes made to the model in the modeling software are exported back out to the XML file.

In a preferred embodiment, the system and method of the present invention utilize three file types. The import/export file stores information including specific parameter information, submitted by a user, e.g., a customer ordering a product, used to build the model. The import configuration file stores information relating to the configuration of the model, such as setting variable units and template names, as well as setting the types of structures available in the modeling program. The filter configuration file is utilized to determine whether the import/export file and the import configuration file are in a valid XML or other web-based language format.

The XML Filter Configuration File, i.e., the filter file, performs the following function. The presence of the filter file notifies the software to offer the XML filter option in the modeling application. In the event that multiple input configuration files are available, the filter file sets the path to the input configuration files. If an import configuration file is not set by a user, the filter file directs the software to set the default import configuration file. The user has the ability to import various types of assemblies for modeling, which could each require a different import configuration file for each type of assembly. The filter file will instruct the software where to look for these different import configuration files. The logic of which specific import configuration file to use for any given XML import/export file will either be included in the specific XML import/export file or the default import configuration file will be used.

The filter configuration file accepts parameter specifications, entered by a user, as either element attributes, i.e., tags, and/or parameter specifications for the product as an element or a child node. Preferably, a file open dialog box in the modeling application includes the file filter to allow the user to select XML files.

The DOM (Document Object Model) document parent node may contain any number of the following element tag values. For each of the default tags, a local tag may exist at the sub child level or at its sub child levels recursively. The local tag will take precedence over any inherited attributes. Examples of preferred tags in the filter configuration file are described below.

A tag named "defaultKeywords" may be used by the filter file, which configures the default key words used by the modeling application. This element must be searched for first by the software when loading the filter configuration file into the application as it will change the names of the tags and or tag values that the application is searching for.

A tag named "pathToConfigFiles" is also used by the filter file. This tag will define the path to all available import configuration files.

If there is no direction in the import/export file as to which import configuration file to use, a tag named "defaultConfigFile" may be used by the filter file. If this tag is not used, then every import/export file used by the import software must contain an element specifying the name of a valid import configuration file. If this tag is used, then any import/export file that does not contain an element specifying the name of a valid import configuration file will use the import configuration file specified by this tag.

The following is an example of a XML filter configuration file:

Example #1

```
<?xml version="1.0" encoding="UTF-8"?>
<!DOCTYPE carrier:ahu>
<XMLFilterConfigFile>
    <keyWordSwap defaultConfigFile="configName">
    <pathToConfigFiles>D:\Users\Airside\</pathToConfigFiles>
    <configName>39M</configName>
</ XMLFilterConfigFile >
```

The solid modeling import configuration file, i.e., import configuration file, is preferably in an XML format. The import configuration file also accepts parameter specifications, entered by a user, as either element attributes, i.e., tags, and/or specifications of variables to be used by the modeling software to build a model of the product, as an element or a child node.

At the attribute level, the import configuration file supports multiple values for attributes. In one embodiment, a parent element, i.e., parent node, supports multiple values for an attribute separated by a ';' character. If the parent node is not to support multiple values for an attributes, a tag is set at the parent node level with a name of "useMultipleAttributeValues" and a value of "false". Examples of this are described as follows (examples #1 and #2 are equivalent, as are examples #3 and #4). In the examples described below, as well as all of the examples in this document, individual tags begin with a "<" character and end with a ">" character.

Example #2

<xmlStructure useRegEx="nodeTypedValue; nodeVale">

Example #3

```
<xmlStructure>
    <useRegEx>nodeTypedValue</useRegEx>
</xmlStructure>
```

Example #4

```
<?xml version="1.0" encoding="UTF-8"?>
<!DOCTYPE carrier:ahu>
<configFile useMultipleAttributeValues="false">
    <configFileChildNode/>
</configFile>
```

Example #5

```
<?xml version="1.0" encoding="UTF-8"?>
<!DOCTYPE carrier:ahu>
<configFile>
    <useMultipleAttributeValues="false"/>
    <configFileChildNode/>
</configFile>
```

The parent node of the import configuration file may contain any number of element tag values. For each of the default tags, a local tag may exist at the sub child level or at its sub child levels recursively. The local tag will take precedence over any inherited attributes.

The tags marked as "(Recursive)" can be set either at the "configFile" element level as default values for all appropriate child nodes of the "configFile" element, or the tags can be set at any of the child nodes or child node's child nodes recursively of the "configFile"'s element. Once a tag is set in the configuration file, that value is inherited by all of the given element's child nodes as the default value. Each child node that inherits a tag from its parent can override that value for itself and its child nodes with its own tag value.

The import configuration file may include a tag named "templatePath" that directs the solid modeling application to the part or assembly that shall be imported into the modeling session. This path shall be used by all parts or assemblies found in the user selected import/export file unless specified by the individual part configuration element. If a template path is not used then each and every part configuration element must specify their template path.

A tag will be used for the default template path to determine if the path is referring to a drive location or to a modeling part management software package such as PTC Corporation's Intralink®. In this embodiment, the tag name is "pathType" and the two values for the tag are "drivePath" or "serverPath".

If the template path tag is not set in the configuration file, an error is sent to the configuration file, the user is notified to check the log file, and the application is terminated. An example of an import configuration file having the template path tag is as follows.

Example #6

```
<?xml version="1.0" encoding="UTF-8"?>
<!DOCTYPE carrier:ahu>
<configFile>
   <defaultTemplatePath
pathType="drivePath">D:\Users\</defaultTemplatePath>
   .
   .
   .
</configFile>
```

A tag named "lengthUnits" configures the default unit of measurement for the modeling application. If this flag value is not set in the import configuration file, then a default value is set, such as inches.

Example #7

```
<?xml version="1.0" encoding="UTF-8"?>
<!DOCTYPE carrier:ahu>
<configFile>
   <lengthUnits>inches</lengthUnits>
   .
   .
   .
</configFile>
```

Example #8

```
<?xml version="1.0" encoding="UTF-8"?>
<!DOCTYPE carrier:ahu>
<configFile lengthUnits ="cm">
   .
   .
   .
</configFile>
```

A tag named "rotationUnits" configures the default unit of rotation for the modeling application. If the flag value is not set in the configuration file then the value is set to a default value, such as degrees.

Example #9

```
<?xml version="1.0" encoding="UTF-8"?>
<!DOCTYPE carrier:ahu>
<configFile>
   <rotationUnits>radians</rotationUnits>
   .
   .
   .
</configFile>
```

Example #10

```
<?xml version="1.0" encoding="UTF-8"?>
<!DOCTYPE carrier:ahu>
<configFile rotationUnits="degrees">
   .
   .
   .
</configFile>
```

The tag named "defaultKeywords" will configure the default key words used by the modeling application. This element must be searched for first when loading the configuration file into the application as it will change the names of the tags and or tag values that the application is searching for. All Keywords specified in this document as either tag names or tag values can be changed in this default key words element except the name of this element being "defaultKeywords".

Example #11

By default, the key words for rotation are:
Tagname="originLocation" with sub level key words of "x", "y" and "z". If a user wanted to just change "x", "y", and "z" to "i", "j", and "k" in the XML file without changing the name "originLocation" then they could specify a tag as follows:

```
<?xml version="1.0" encoding="UTF-8"?>
<!DOCTYPE carrier:ahu>
<configFile>
   <keyWordSwap>
      <originLocation x="i" y="j" z="k" />
   </keyWordSwap>
   .
   .
</configFile>
```

Example #12

Similarly to example #10, if a user wants to change the key word "originLocation" to "pointsList", the following tags would be used:

```
<?xml version="1.0" encoding="UTF-8"?>
<!DOCTYPE carrier:ahu>
<configFile>
   <keyWordSwap>
      <originLocation x="i" y="j" z="k">pointsList</originLocation>
   </keyWordSwap>
   .
   .
</configFile>
```

Example #13

The following tag configuration would allow the software to find an element and place it at the location denoted as x=5, y=5, z=0 in the model space. The xu, yu, and zu attributes would be ignored in this example.

The following is a configuration file extract:

```
<keyWordSwap>
    <originLocation x="xl" y="yl" z="zl">points</originLocation>
```

The following is an extract from the user selected XML file:
<points xl="5" yl="5" zl="3" xu="7" yl="7" zl="33">

"xl" denotes a lower x-coordinate value, and "xu" denotes an upper x-coordinate value. Similar notations are provided for y and z-coordinate values.

The import configuration file includes a part configuration element, to direct the configuration of constituent parts of a model to be built by the modeling software. This "part Configuration" element configures the modeling software as to what parts of the XML Import/Export file are to be imported into the workspace of the modeling software, and how to import them. The part configuration element contains one of each of the following tags marked as (Required) and may contain any number of the tags not marked as (Required).

A template name element (required), shown as a "templateName" tag, works in conjunction with the template path to identify which part is to be imported into the modeling workspace.

Example #14

This example would set the path to the given part template as "D:\Users\Frame Members Part":

```
<?xml version="1.0" encoding="UTF-8"?>
<!DOCTYPE carrier:ahu>
<configFile>
    <defaultTemplatePath
pathType="drivePath">D:\Users\</defaultTemplatePath>
    <partConfiguration>
        <templateName>Frame Members Part</templateName>
        .
        .
        .
    </partConfiguration>
    .
    .
    .
</configFile>
```

An element structure element, shown as an "elementStructure" tag, flags an element in the XML Import/Export file that is to be imported into the model.

The key tag values to search when comparing a configuration file to the XML file are nodeName, nodeTypedValue, attributeName, attributeValue, and the parent child relationship. Any tag of the "elementStructure" named "elementStructureInfo" is not used to identify an element in the XML file but will be used to set the attributes as to how the element in the XML file is identified.

If an element structure tag is not provided in the part configuration element, then any element in the import/export file will be matched to the given configuration element.

Example: #15

The following are extracts from a valid configuration file:

```
<?xml version="1.0" encoding="UTF-8"?>
<!DOCTYPE carrier:ahu>
<configFile>
    <partConfiguration>
        <elementStructure nodeName="partNumber"
nodeTypedValue="93FXX33BL00564R44R"/>
        .
        .
        .
    </partConfiguration>
    <partConfiguration>
        <elementStructure nodeName="partNumber"
nodeTypedValue="93FXX33BL00564R5"
useRegEx="nodeTypedValue"/>
        .
        .
        .
    </partConfiguration>
    <partConfiguration>
        <elementStructure>
            <partNumber>93FXX33BL00564R78R</partNumber>
        </elementStructure>
        .
        .
        .
    </partConfiguration>
    <partConfiguration>
        <elementStructure>
            <version>1.2</version>
            <partNumber>48TJD1200-A</partNumber>
            <drawing>39MA50003030</drawing>
        </elementStructure>
        .
        .
        .
    </partConfiguration>
    .
    .
    .
</configFile>
```

A "part instance match" element, shown as a "partInstanceMatch" tag, tells the import software how to know what value from the selected XML file to use in retrieving the instance, i.e., a specific set of data that is chosen from a larger dataset, from the template.

The "partInstanceMatch" tag follows the same basic structure as the "elementStructure" tag, including parent child relationships. This tag must have a return attribute of "nodeName", "nodeTypedValue", "elementName" or "elementValue" called returnValue.

Example #16

The following is a part instance match configuration file element:

```
<partInstanceMatch returnValue="nodeTypedValue" useRegEx="true">
    <partNumber>93FXX</partNumber>
</partInstanceMatch>
```

This element is matched against the user selected XML file's element:
<partNumber>93FXX34BL19856723B</partNumber>
This element tells the software application to use the instance named 93FXX34BL19856723B in the mode space.

A recursive case sensitive tag, i.e., "caseSensitive" tag, defines that comparisons between the configuration file element property and the user supplied XML input file's element or property are case sensitive. The default value if the tag is not defined or inherited is "true". The two options for the case sensitive tag are "true" and "false" where the text strings "true" and "false" are not case sensitive.

Example #17

The following are extracts from a valid configuration file:

```
<?xml version="1.0" encoding="UTF-8"?>
<!DOCTYPE carrier:ahu>
<configFile defaultCaseSensitive="true">
    <partConfiguration caseSensitive="false">
        <elementStructure nodeName="partNumber"
nodeTypedValue="93FXX33BL00564R5"
useRegEx="nodeTypedValue"/>
        .
        .
        .
</configFile>
```

A recursive "useRegEx" tag defines that any of the comparisons between the configuration file element property and the user supplied XML input file's element or property are to be compared using a regular expression engine. If this tag is invoked then at least one or more of the following attributes or child nodes must be set "nodeName", "nodeTypedValue", "attributeName" or "attributeValue". The following examples are nodes extracted from a valid configuration file. Examples #20 and #21 are equivalent.

Example #18

<elementStructure useRegEx="nodeTypedValue"/>

Example #19

<elementStructure useRegEx="nodeTypedValue"/>

Example #20

<elementStructure useRegEx="nodeTypedValue; nodeValue"/>

Example #21

```
< elementStructure >
    <useRegEx>nodeTypedValue</useRegEx>
    <useRegEx>nodeValue</useRegEx>
</elementStructure >
```

The import configuration file may contain other attributes or child nodes outside the scope of this specification that are read or may be ignored by the software.

An example of an import configuration file follows:

Example #22

```
<?xml version="1.0" encoding="UTF-8"?>
<!DOCTYPE carrier:ahu>
<configFile>
```

-continued

```
<partConfiguration>
    <templateName>Frame Members Part</templateName>
    <elementStructure>
        <partNumber>93FXX33BL0056R78R</partNumber>
        <version>1.0</version>
    </elementStructure>
</partConfiguration>
<partConfiguration>
    <templateName>Frame Members Part New</templateName>
    <elementStructure useRegEx="nodeTypedValue">
        <partNumber> 93FXX[45]</partNumber>
        <version>1.0</version>
    </elementStructure>
</partConfiguration>
</configFile>
```

The import/export file contains the structure of a specific model to be imported into and assembled by the solid modeling software. Exemplary tags are described below.

A cutout features tag, named "cutoutFeatures", configures cutout features that are supported by the modeling application. A cutout feature is a modification to the template. For example, a template may define a two dimensional sheet, and the cutout feature may be a hole in the middle of the sheet. Each modeling application has a list of cut out features that are supported by its software. Some of the basic shapes that are generally supported by a modeling software application should be supported are described as follows. Each cutout is assigned a default tag value. A modeling application can reserve the right to change these default tag values. If the default tag values are changed, the application developer must supply a specification on their notation.

One shape is a cylinder cutout, having a default notation tag value "Cylinder" attributes or child nodes and values. "axis"="x", "y", or "z" is the part origin axis that parallels the cylinders axis. "xCenter"="1.0", or any given value, specifies the x coordinate of the cylinder. "yCenter"="1.0", or any given value, specifies the y coordinate of the cylinder. "zCenter"="1.0", or any given value, specifies the z coordinate of the cylinder.

"cutoutDepth"="1.0", or any given value, specifies the depth that the cylinder will cut into the part. "cutDiameter"="1.0", or any given value, specifies the diameter of the cylinder to cut into the part.

A rectangle cutout has the default tag value "Rectangle" attributes or child nodes and values. "xl"="1.0", or any given value, specifies the lower x coordinate value for the rectangle to be cut into the part. "yl"="1.0", or any given value, specifies the lower y coordinate value for the rectangle to be cut into the part. "zl"="1.0", or any given value, specifies the lower z coordinate value for the rectangle to be cut into the part. "xu"="1.0", or any given value, specifies the upper x coordinate value for the rectangle to be cut into the part.

"yu"="1.0", or any given value, specifies the upper y coordinate value for the rectangle to be cut into the part. "zu"="1.0", or any given value, specifies the upper z coordinate value for the rectangle to be cut into the part.

A line sketch has the default tag value of "Line" attributes or child nodes and values. "xl"="1.0", or any given value, specifies the lower x coordinate value for the line to be sketched onto the part. "yl"="1.0", or any given value, specifies the lower y coordinate value for the line to be sketched onto the part. "zl"="1.0", or any given value, specifies the lower z coordinate value for the line to be sketched onto the part.

"xu"="1.0", or any given value, specifies the upper x coordinate value for the line to be sketched onto the part.

"yu"="1.0", or any given value, specifies the upper y coordinate value for the line to be sketched onto the part. "zu"="1.0", or any given value, specifies the upper z coordinate value for the line to be sketched onto the part.

Example #23

The following example represents Example a 2' cubed box having a 1" hole drilled ¼" deep into its top surface:

```
<?xml version="1.0" encoding="UTF-8"?>
<!DOCTYPE carrier:ahu>
<Unit>
   <manufacturedItem>
      <version>1.02</version>
      <partNumber>93FXX11EB00490912G</partNumber>
      <description>2' x 2' box</description>
      <locationNumber>11111221</locationNumber>
      <points xl="0.0" yl="0.0" zl="0.0" xu="24.0" yu="24.0" zu="24.0" length="7.0"/>
      <weight>2.22</weight>
      <cutoutFeatures axis="x" xCenter ="12.0" yCenter="24.0" zCenter="12.0" cutoutDepth=".25">Cylinder</cutoutFeatures>
   </manufacturedItem>
</Unit>
```

The XML Import/Export File may contain a "path to import configuration file" element having a key tag value of either "pathToConfigFile" or any substituted key tag value as specified in the Default Keywords element of the XML filter configuration file. If this tag is present in the import/export file, the software will use the specified import configuration file to evaluate the given import/export file. If this tag is not present in the import/export file, the software will use the default import configuration file as specified in the import configuration file.

The "path to import configuration file" tag may contain a sub tag called "path" or a substituted key tag value as specified in the Default Keywords element of the Filter Configuration File. If this tag is used, the software sets the path to the import configuration file used by the import/export file.

An example of an import/export file follows:

Example #24

```
<?xml version="1.0" encoding="UTF-8"?>
<!DOCTYPE carrier:ahu>
<ahuUnit>
   <defaultConfigFile path="D:\Vulcan\">Frame Members</defaultConfigFile>
   <version>12.2</version>
   <partNumber>93FXX12BL00554512E</partNumber>
</ahuUnit>
```

Figure 3:
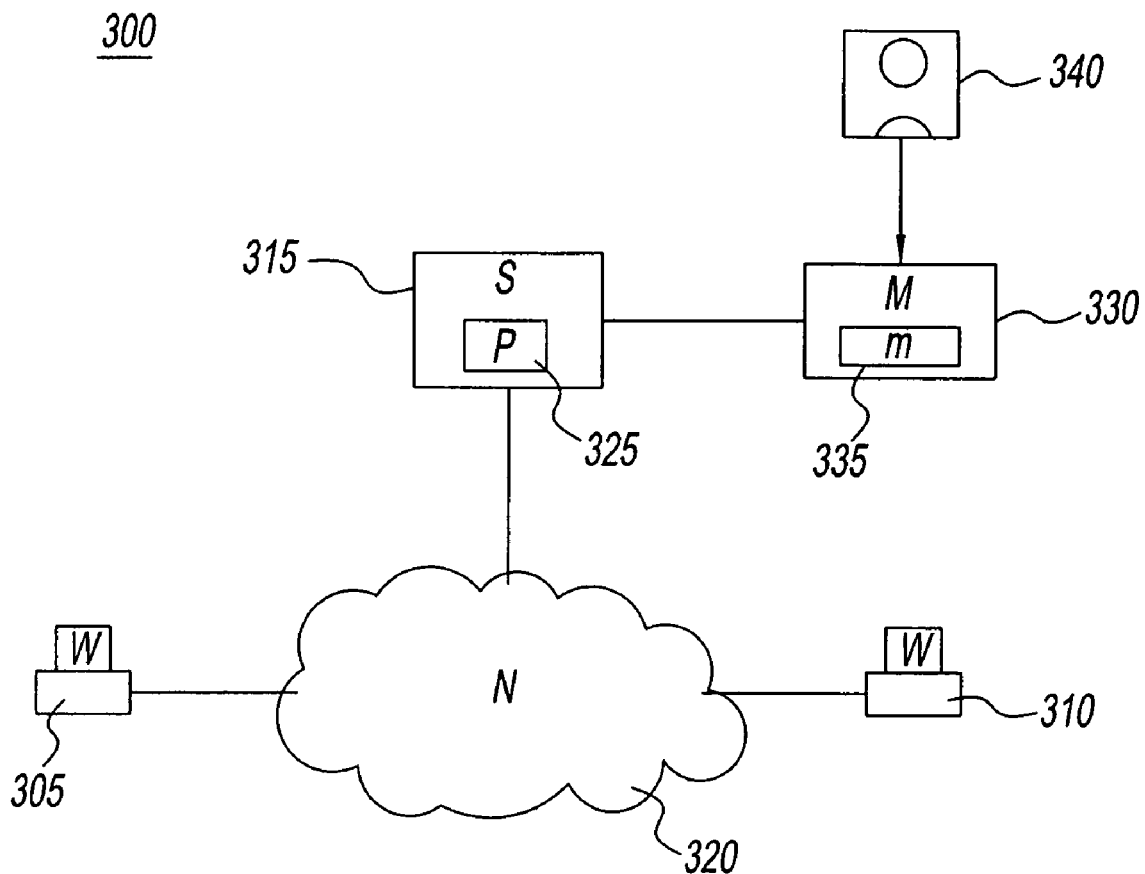
FIG. 3 is a block diagram of a computer system suitably configured for employment of the present invention.

FIG. 3 is a block diagram of a computer system 300 suitably configured for employment of the present invention. The principal components of system 300 are user workstations 305, 310, and a server 315 coupled to a network 320.

Server 315 includes a processor 325, and is coupled to a memory 330. Memory 330 includes a program module 335 that contains instructions for execution by processor 325 to perform the methods of the present invention as described herein. That is, program module 335 contains instructions for initiation of the solid modeling import software.

While the procedures required to execute the invention are indicated as already loaded into memory 330, they may be configured on a storage media 340 for subsequent loading into memory 330. Storage media 340 can be any conventional storage media such as a magnetic tape, an optical storage media, a compact disk, or a floppy disk. Alternatively, storage media 340 can be a random access memory, or other type of electronic storage, located on a remote storage system.

Workstations 305, 310 may also include a browser platform to allow a user to input product specifications and order the manufacture of a product based on those specifications. The specifications inputted by the user are stored in the XML file, or a file in another web-based or markup language. The XML file includes the product specifications and/or a selection of an import configuration file. The server receives the XML file, stores the XML file in memory 330 or memory 340. The import software, stored in memory 330 or 340, then performs the method described herein to configure the specification information and import the information to a solid modeling program, which in turn builds a model of the product.

The method and system of the present invention automatically configures specification information stored in a web-based language into a format that can be recognized and incorporated by a computer modeling software program. Such a method and system avoids the time-consuming and relatively expensive alternatives of building a unit without prior modeling, or building a model by manually programming specification information to create a model.

The present invention thus eliminates many of the disadvantages to receiving specification information through the internet or other network, while preserving the advantages, such as convenience and reduced cost, that are inherent in web-based ordering systems.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A computer-implemented method for modeling a product, comprising:
    receiving by a software module at least one web-based language import/export file containing information specifying parameters of the product to be manufactured;
    determining if the import/export file is valid in response to tags in the import/export file being correctly configured;
    determining if the import/export file includes a configuration element identifying an import configuration file;
    loading a configuration file, the configuration file being one of the identified import configuration file or a default configuration file, and setting variables and tags in the configuration file;
    comparing each element in the import/export file to part configuration elements in the configuration file to determine whether the elements in the import/export file are valid for inputting into a model; and
    when elements in the import/export file are valid for inputting into a model, then using the import/export file to create a template that is imported into a solid modeling program for modeling the product.

2. The method of claim 1, further comprising:
    receiving said information via an input module; and storing said information in said at least one web-based language file.

3. The method of claim 1, wherein said at least one web-based language file is a markup language.

4. The method of claim 3, wherein said markup language is selected from the group consisting of: standard general markup language (SGML), hypertext markup language (HTML), and extensible markup language (XML).

5. The method of claim 1, wherein said solid modeling program is a computer-aided drafting (CAD) program.

6. The method of claim 1, wherein:
the configuration file includes instructions for configuring the variables of a modeling program used to build a model of said product.

7. The method of claim 6, wherein said information includes information selected from the group consisting of: a selection of an existing configuration file, configuration information for the creation of said configuration file, and a combination thereof.

8. The method of claim 1, further comprising:
building a representation of said product based on said specification information.

9. A modeling system comprising:
a processor having a memory;
a program module stored in said memory, wherein said program module includes instructions for:
receiving by a software module at least one web-based language import/export file containing information specifying parameters of the product to be manufactured;
determining if the import/export file is valid in response to tags in the import/export file being correctly configured;
determining if the import/export file includes a configuration element identifying an import configuration file;
loading a configuration file, the configuration file being one of the identified import configuration file or a default configuration file, and setting variables and tags in the configuration file;
comparing each element in the import/export file to part configuration elements in the configuration file to determine whether the elements in the import/export file are valid for inputting into a model, and
when elements in the import/export file are valid for inputting into a model, then using the import/export file to create a template that is imported into a solid modeling program for modeling the product.

10. The system of claim 9, further comprising an input module for receiving said information, and storing said information in said at least one web-based language file.

11. The system of claim 9, wherein said web-based language is a markup language.

12. The system of claim 11, wherein said markup language is selected from the group consisting of: standard general markup language (SGML), hypertext markup language (HTML), and extensible markup language (XML).

13. The system of claim 9, further comprising:
instructions for providing a configuration file that includes instructions for configuring the variables of a modeling program used to build a model of said product.

14. A storage medium comprising a program module having instructions for:
receiving by a software module at least one web-based language import/export file containing information specifying parameters of the product to be manufactured;
determining if the import/export file is valid in response to tags in the import/export file being correctly configured;
determining if the import/export file includes a configuration element identifying an import configuration file;
loading a configuration file, the configuration file being one of the identified import configuration file or a default configuration file, and setting variables and tags in the configuration file;
comparing each element in the import/export file to part configuration elements in the configuration file to determine whether the elements in the import/export file are valid for inputting into a model, and
when elements in the import/export file are valid for inputting into a model, then using the import/export file to create a template that is imported into a solid modeling program for modeling the product.

* * * * *